(12) United States Patent
Hokari

(10) Patent No.: US 6,327,360 B1
(45) Date of Patent: Dec. 4, 2001

(54) SYSTEM FOR MANAGING OFFICE DATA IN AN EXCHANGE, SUBSCRIBER'S NUMBER ASSIGNING SYSTEM, AND SAME NUMBER MIGRATING SYSTEM

(75) Inventor: Makoto Hokari, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/181,634

(22) Filed: Oct. 29, 1998

(30) Foreign Application Priority Data

Oct. 29, 1997 (JP) .................................................. 9-297355

(51) Int. Cl.[7] .................................................. H04M 7/00
(52) U.S. Cl. .............................. 379/221.13; 379/207.08; 379/219; 379/221.14
(58) Field of Search .................................. 379/219, 220, 379/207, 230, 229, 207.08, 221.13, 221.14

(56) References Cited

U.S. PATENT DOCUMENTS

| | | | |
|---|---|---|---|
| 5,440,541 | * | 8/1995 | Iida et al. ............................... 370/60.1 |
| 5,509,058 | * | 4/1996 | Sestak et al. .......................... 379/201 |
| 5,717,748 | * | 2/1998 | Sneed, Jr. et al. .................... 379/207 |
| 5,867,569 | * | 2/1999 | Martinez et al. ................ 379/221.13 |
| 5,883,948 | * | 3/1999 | Dunn .................................... 379/210 |
| 5,883,950 | * | 3/1999 | Sonnenberg .......................... 379/220 |
| 5,910,981 | * | 6/1999 | Bhagat et al. ........................ 379/219 |
| 5,913,160 | * | 6/1999 | Leung ................................... 455/403 |

* cited by examiner

Primary Examiner—Ahmad Matar
Assistant Examiner—Bing Bui
(74) Attorney, Agent, or Firm—Foley & Lardner

(57) ABSTRACT

An exchange is provided. Particularly, an office data management system where exchanges in a switching network can be operated and managed in common, a system for assigning personal numbers to subscribers, and a same subscriber's number migrating system where the same subscriber's number can be used even after a subscriber is sifted from an exchange to another are provided. Each node exchange includes a numbering plan inherent to a node, individual office data storing extension information, a numbering plan common to the entire network, and a common office data storing extension information. A certain exchange acting as a master in a station allots a copy of the common office data to each node via a data-link control circuit (FCCH) that transmits and receives call control signals and maintenance signals. A subscriber personal number assigning system that assigns a number to a person, not to a telephone set, by allocating a number to a logical index to the common office data, instead of a physical telephone set, is employed to the common office data. In the case of a subscriber's relocation, the same number can be migrated by arbitrarily changing a physical telephone set to a logical index existing in the common office data according to directions from a centralized maintenance terminal.

18 Claims, 4 Drawing Sheets

SYSTEM FOR MANAGING OFFICE DATA IN AN EXCHANGE, SUBSCRIBER'S NUMBER ASSIGNING SYSTEM, AND SAME NUMBER MIGRATING SYSTEM

BACKGROUND OF THE INVENTION

The present invention relates to an exchange. Particularly, the present invention relates to an office data management system that can be operated and managed in common by each of exchanges in a switching network. The present invention also is to provide a system for assigning personal numbers to subscribers. Moreover, the present invention relates to a same subscriber number migrating system where the same subscriber number can be used even if a subscriber is transferred to another exchange.

Conventionally, when a subscriber is accommodated in a different exchange, its area code and its subscriber number are changed. In the conventional open numbering plan made by area codes and subscriber numbers, where a subscriber is relocated a station with a different area code, its area code is necessarily changed, so that the same station cannot manage and operate plural area codes. Moreover, in the closed numbering system made by only subscriber numbers, the subscriber can be basically relocated with the same subscriber number. However, when subscriber numbers are accommodated at random, which station a subscriber is accommodated in cannot be specified if the subscriber number is checked up to the last digit. This system complicates the numbering plan. In the worst cases, a change in one subscriber may require changing the office data in all the exchanges within a network. This results in increased working costs. Hence, since large-scaled networks employ the open numbering plan or partially the closed numbering plan, it has been substantially impossible to migrate a subscriber with the same number. Moreover, since each exchange managing subscriber numbers manages its numbering plan, even one subscriber's relocation causes requires changing office data in two exchanges or more, thus causing troublesome tasks.

As described above, the conventional exchange involves in always changing the subscriber number when a subscriber is relocated to another exchange. Changes in the subscriber number make the company's business activity and private life very inconvenient. Recently, there have been strong demands for the necessity of personal telephone numbers. For that reason, a switching system is required such that can realize uses of personal telephone numbers and facilitate the operation and management.

The system where plural distributed node exchanges configures a network so as to operate as one exchange is proposed (refer to Japanese Patent Application (Tokugan-Hei) No. 11263/1997).

SUMMARY OF THE INVENTION

The objective of the present invention is to solve the above-mentioned tasks.

The objective of the present invention is to provide an office data management system that can control all exchanges in the above-mentioned distributed node switching system so as to operate as one exchange. In the switching system, all node exchanges must be operated and managed in a shared mode. Since the area origination code depends on area conditions under which the node is installed, each node must individually implement operation and management.

The objective of the present invention is to provide an office data management system which has two kinds of data including common office data operated and managed in common at respective nodes and individual office data individually operated and managed at respective nodes.

Moreover, the objective of the invention is to provide a subscriber's number assigning system wherein a telephone number is assigned to a subscriber, not to a telephone set.

Furthermore, the objective of the present invention is to provide a same number migrating system where a subscriber can use the same subscriber's number even if the subscriber is accommodated for another exchange, wherein correspondences between subscribers and telephone sets are changed in accordance with a maintenance operation procedure or by a subscriber itself.

Still further, the another objective of present invention is to provide a system for facilitating a maintenance operation procedure involved in changes in subscribers of plural exchanges.

The objective of the present invention is achieved by an office data management system comprising plural exchanges interconnected to configure a switching network; each of the plural exchanges including a main storage memory; the main storage memory containing individual office data and common office data, as office data such as numbering plan information and subscriber information necessary for switching process; the individual office data being individually operated and managed in each of the exchanges; the common office data being operated and managed in common by all the exchanges in the network.

In the office data management system, each of the exchanges comprises means for receiving and storing a selection signal dialed by a subscriber; and means for analyzing the stored selection signal according to the numbering plan information existing in the office data; and the stored selection signal is first collated with numbering plan information existing in the common office data; and a connection process is performed in accordance with the common numbering plan information when a corresponding number can be registered as common numbering plan information and is recognized as an extension, a B board, a call origination, a special service code, or the like in the network; and the corresponding number is collated with individual numbering plan information existing in the individual office data individually registered at each node when the corresponding number cannot be recognized; and a connection process is performed in accordance with the individual numbering plan when it can be recognized whether the corresponding number is an extension, a B board, a call origination, a special service code, or the like in an exchange accommodating an originator; and origination restriction is performed when the corresponding number cannot be recognized.

In the office data management, the common office data has means for issuing data registration and data changing instruction from a centralized maintenance I/O unit connected to a specific exchange in the network and thus batch registering and changing common office data in the main storage memory of all the exchanges within the network by means of broadcast transmission means via a line through which a call control signal and a maintenance signal are transmitted between exchanges; and the individual office data has means for registering and changing only individual office data in the main storage memory in an exchange by specifying an exchange having individual office data which are changed from the centralized maintenance I/O unit via a line through which the call control signal and the maintenance signal are communicated between exchanges and then issuing data registration and change instruction; and the individual office data comprises means for registering and changing only individual office data in the main storage memory in an exchange by issuing data registration and data changing instruction from a maintenance I/O unit connected to each exchange.

Furthermore, in the base data management system, the common office data comprises means for periodically checking whether or not the common office data is the same as that for a specific exchange acting as a master exchange in the network via a line through which call control signals and maintenance signals used between exchanges are communicated with other exchanges; and means for checking whether or not the common office data is the same that for the master exchange via the line when the line which carries a call control signal and a maintenance signal from the master exchange to other exchanges recovers from failure and then becomes a communicable state; and an exchange which is judged that common office data is different from that for the master exchange as a result from the checking means includes means for copying common office data for the master exchange via the line.

The line which carries the call control signal and the maintenance signal between the exchanges includes means for transmitting and receiving the maintenance signal in a multiplex mode on a line used for transmission and reception of the call control signal, not a dedicated line, for the maintenance signal.

Moreover, in an office data management system in a subscriber's number assigning system according to the present invention, subscriber's numbers allocated to subscribers in a network configured of plural exchanges are managed based on numbering plan information and subscriber information of common office data operated and managed in common in all exchanges so that the subscribers can be operated and managed as accommodated by one exchange.

Furthermore, in an exchange having the main storage memory by which a logical accommodation location, not a physical accommodation location, of a telephone set, is obtained as subscriber information when a dialed destination is particularly indicates a subscriber such as an extension or a B board by analyzing a selection signal dialed by a subscriber according to common numbering plan information in the common office data, the exchange has accommodation location conversion means within a common memory which can be accessed from and changed by all the exchanges in the network, the accommodation location conversion means assigning a logical accommodation location to a physical accommodation location of a telephone set or a subscriber line, so that a subscriber's number is assigned to a telephone user, without comparing a subscriber's number with a physical telephone set in a one-to-one relationship.

Moreover, according to a same number migrating system in a subscriber's number assigning system of the present invention, in an exchange having the main storage memory by which a logical accommodation location, not a physical accommodation location, of a telephone set, is obtained as subscriber information when a dialed destination is particularly indicates a subscriber such as an extension or a B board by analyzing a selection signal dialed by a subscriber according to common numbering plan information in the common office data, the exchange has conversion information management means within a common memory which can be accessed from and changed by all the exchanges in the network, the conversion information management means corresponding a logical accommodation location to a physical accommodation location of a telephone set or a subscriber line; and when a subscriber is accommodated from an exchange to another, the same subscriber number is maintained by varying only correspondences between a logical accommodation location and a physical accommodation location of subscriber information in the common memory according to an office data management system.

In the subscriber's number assigning system according to the present invention, the conversion information management means that assigns a logical accommodation location stored in the common memory to a physical accommodation location of a telephone set or a subscriber line stored therein includes means for dynamically changing correspondences between a logical accommodation location and a physical telephone set by a procedure from a telephone set or in accordance with an instruction from the centralized control unit in an exchange.

BRIEF DESCRIPTION OF THE DRAWINGS

This and other objects, features and advantage of the present invention will become more apparent upon a reading of the following detailed description and drawings, in which.

DESCRIPTION OF THE EMBODIMENTS

Embodiments according to the present invention will be described with reference to FIGS. 1, 2, 3, and 4.

Figure 1:
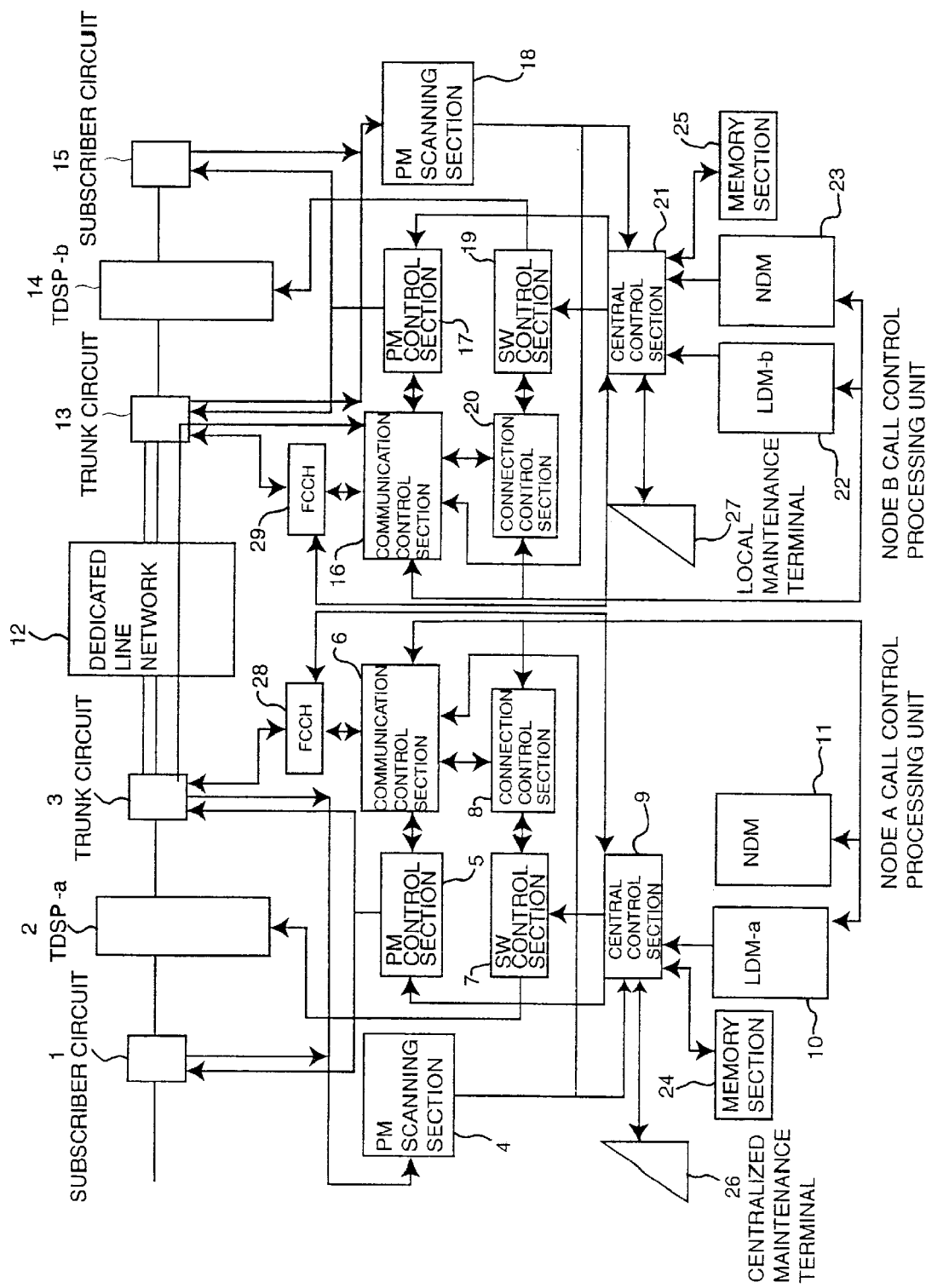
FIG. 1 is a block diagram illustrating a basic configuration for office data management, extension number assignment and same number migration according to an embodiment of the present invention.

FIG. 1 shows an embodiment realizing an office data management system, an extension number assigning system and a same number migrating system according to the present invention.

Referring to FIG. 1, a node A includes a speech path switch (TDSP-a) 2, a PM scanning section 4 realized by a call process software for a node call process and control circuit or processor CPU, a central control section 9, a PM control section 5, a SW control section 7, a connection control section 8, and a communication control section 6. A node B includes a speech path switch (TDSP-b) 14, a PM scanning section 18 realized by a call process software for a node call process and control circuit or processor CPU, a central control section 21, a PM control section 17, a SW control section 19, a connection control section 20, and a communication control section 16.

In the nodes A and B, information for various kinds of service function control are held in an office data storage memory which can be accessed from the central control section. The node A has individual office data LDM-a as information being inherent to each node and network common office data NDM11 being common to each node. The node B has individual office data LDM-b as information being inherent to each node and network common office data NDM23 being common to each node. A centralized maintenance terminal 26 registers or deletes the individual office data and the common office data and reads or write data out of or into a storage memory via the central control unit.

Figure 2:
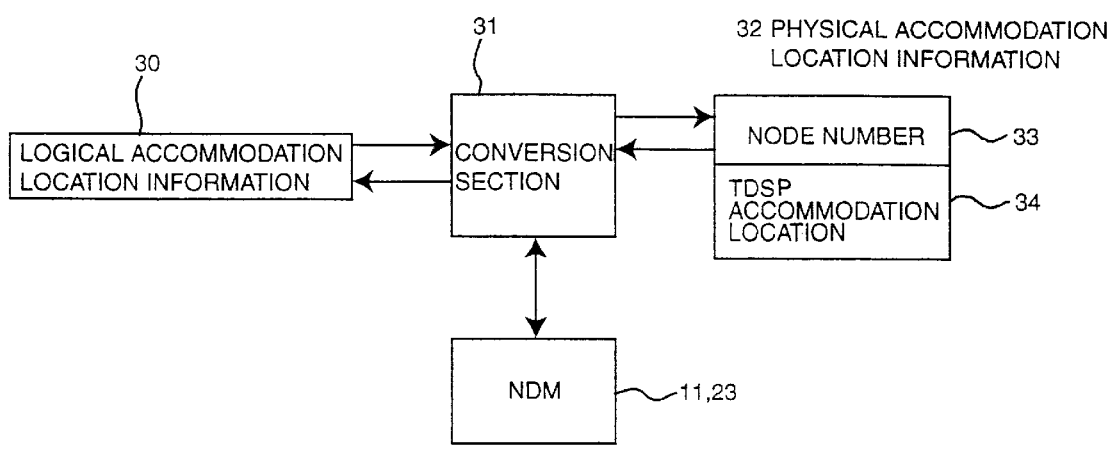
FIG. 2 is a block diagram illustrating an accommodation location conversion section in a node exchange according to an embodiment of the present invention.

FIG. 2 is a block diagram illustrating an accommodation location conversion section. A physical accommodation location representing a physical implementation location and a logical accommodation location independent to the physical accommodation location are allocated to call control resources of subscriber circuits, trunk circuits accommodated in a node exchange.

A conversion section 31 is realized by the call process software for the control circuit or processor CPU and is a circuit for performing conversion from a logical accommodation location to a physical accommodation location as well as conversion from the inverse physical accommodation location to a logical accommodation location. The conversion section 31 exists in each node. The accommodation location conversion section is a circuit that can be accessed from the PM scanning section 4 or 18, the PM control section 5 or 17, the SW control section 7 or 19, the connection control section 8 or 20, or the communication control section 6 or 16, except the central control section. The central control section controls based on only the logical accommodation location, thus eliminating accessing the control section.

Figure 3:
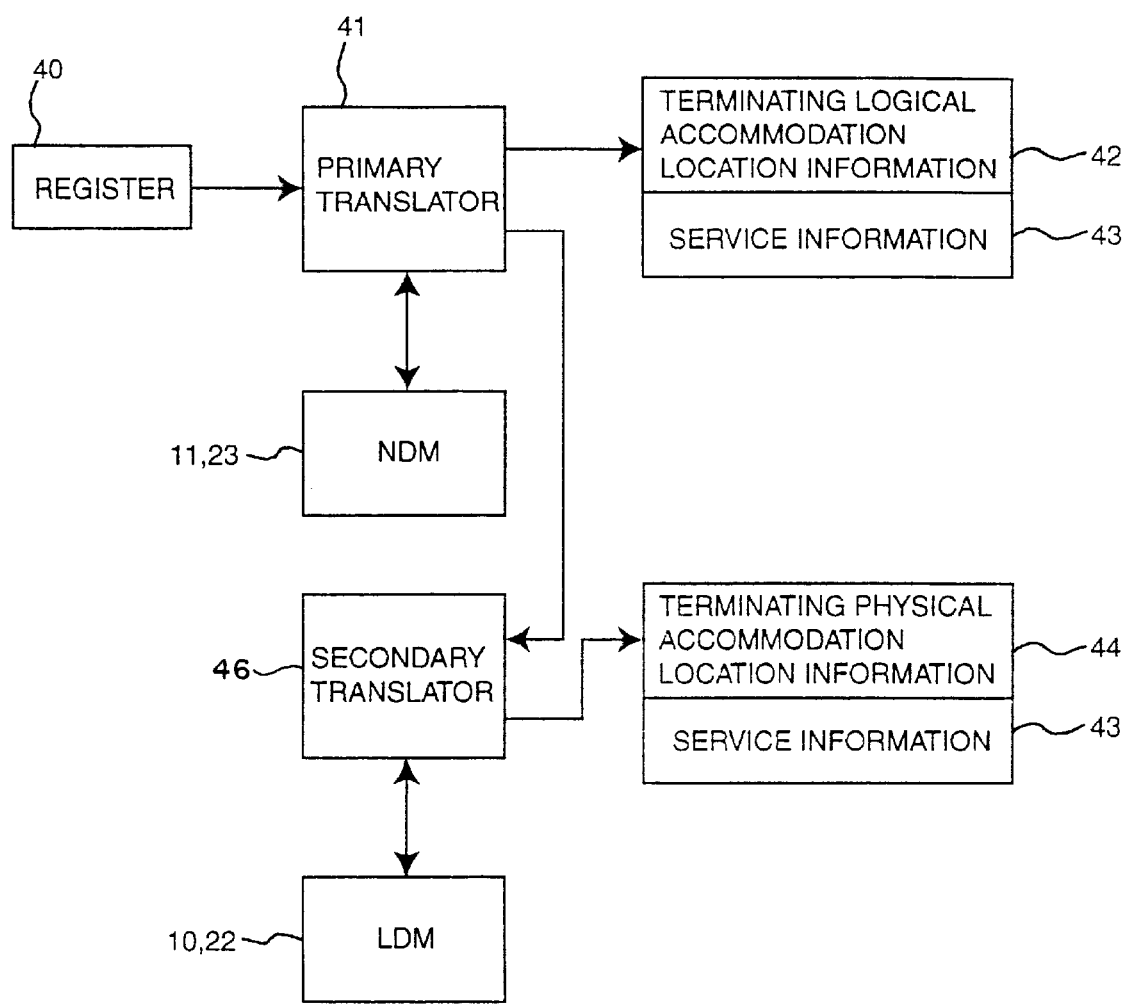
FIG. 3 is a block diagram illustrating translators in a node exchange according to an embodiment of the present invention.

FIG. 3 is a block diagram illustrating translators. The number analysis is performed in two stages including a primary analysis and a secondary analysis. The logical accommodation location information 42 and the service information 43 of call control services regarding a called party stored in the NDM 11 or 32 are captured by subjecting a number dialed by an originator to the primary analysis. If information is not obtained through the primary analysis, the physical accommodation location information 44 and the service information 45 of a called party stored in the LDM 10 or 22 are captured through the secondary analysis. Since the primary analysis is a number analysis applied in common in the entire network, a subscriber can dial to the same party through any exchange in the network. The results of the primary analysis can be utilized as personal telephone numbers of subscribers accommodated in the network. The secondary analysis is a number development inherent to each node exchange. In the secondary analysis, even if the same subscriber number exists in plural exchanges, the subscriber accommodated in the same node as the originator is always connected. According to the individual numbering plan, the office data in the conventional station can be applied in a new system by setting office data already in a working state to the LDM.

Next, how to use individual office data and common office data according to the present embodiment will be described below.

The PM scanning section scans the subscriber circuit, the trunk circuit, and the register circuit and then detects event information such as a call control request and a received figure information of each circuit. When the PM scanning section 4 detects the origination process of the subscriber circuit 1 at the node A, the central control section 9 connects the register circuit 40 to the subscriber circuit to receive the dial information. When the central control section 9 has completely received analyzable dial information, the memory section 24 stores it. Then the primary translator 41 subjects the stored dial information to a number analysis. In the number analysis, when the NDM11 registers the dial information first analyzed and received according to the numbering plan existing in the NDM11, the terminating logical accommodation location information 42 and the service information 43 used for various kinds of connection service on a called extension line are captured. If the analysis has failed because no information is stored in the NDM11, the secondary translator 46 again analyzes the dial information sorted in the memory section 24. In the secondary analysis, when The LDM 10 registers the dial information analyzed and received according to the numbering plan information for each node existing in the LDM10, the terminating logical accommodation location information 44 and the service information 45 are captured.

In the embodiment, the numbering plan information for an extension mutual connection will be described in detail. However, in a similar manner to those described above, the method of first performing an analysis based on the common office data and then performing an analysis based on individual office data if the previous analysis fails is applicable to office line origination an dedicated line origination.

The central control section 9 which has obtained the logical accommodation location information to be connected through an number analysis executes the process of connecting the terminating extension line so the terminating extension line represented by the terminating logical accommodation location. This call control method corresponds to the method proposed in the Japanese Patent Application No. 11263/1997. However, the central control section 9 performs all call control operations at logical accommodation locations but recognizes no physical accommodation locations. The recognition of the physical location is controlled by converting into an actual physical accommodation location by means of the PM scanning section 4, the PM control section 5, the SW control section 7, the connection control section 8, the communication control section 6, and the like, which must be controlled by the subscriber circuit and the trunk circuit and the like.

Next, the method of registering and changing individual office data and common office data will be described below.

The centralized maintenance terminal 26 can change and delete the registration information in the LDM 10 and the NDM11 of the self station via the central control section 9. The LDM22 and the NDM23 of another station are changed via the central control section 9, the FCCH 28, the FCCH 29, and the central control section 21.

Figure 4:
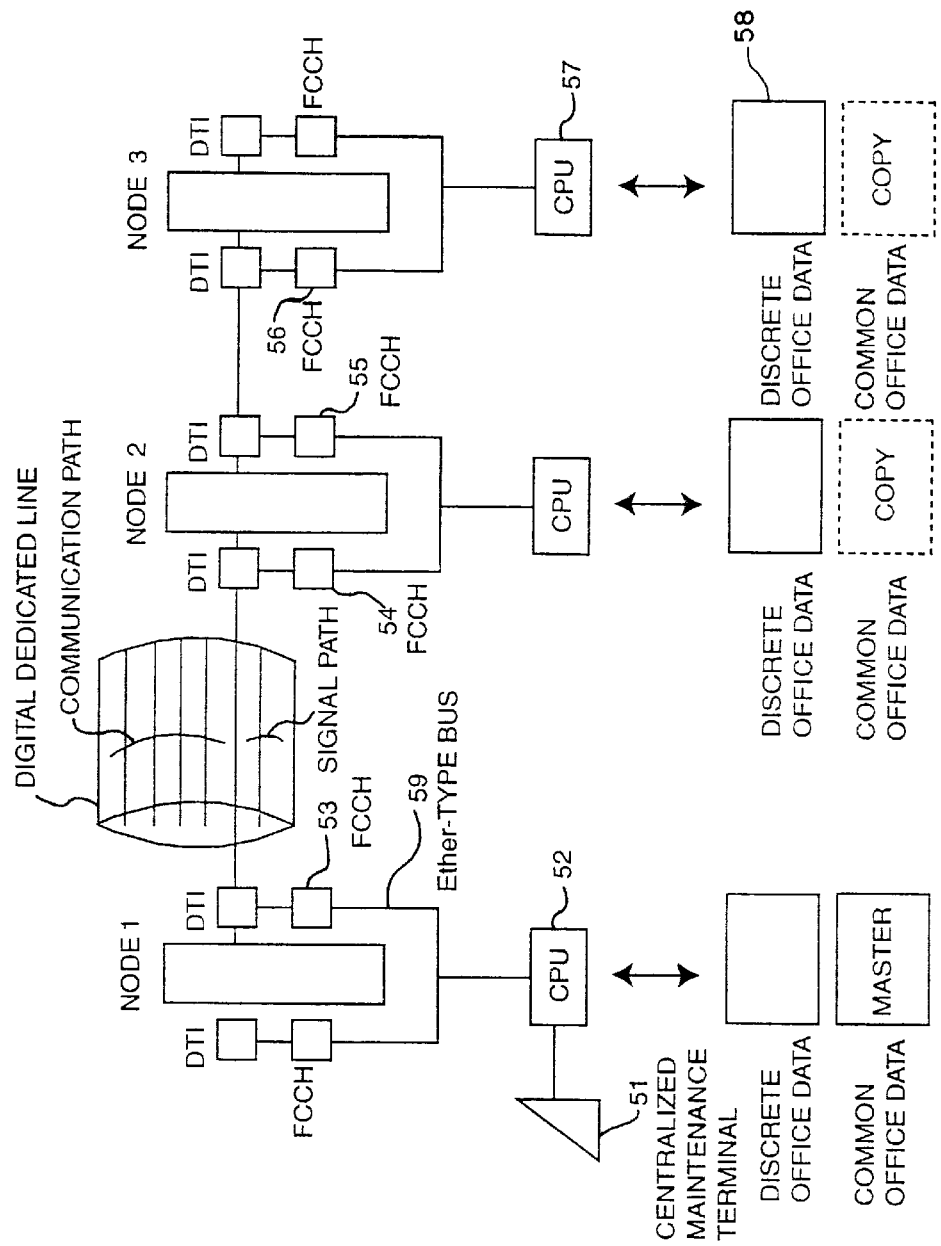
FIG. 4 is a system block diagram illustrating a node exchange according to an embodiment of the present invention.

The FCCH is a data link control circuit that can separate the call control signal of the communication control section 6 or 16 from the maintenance signal of the central control section 9 or 21 in a multiplex mode. The FCCH, as shown in FIG. 4, is prepared for each route. Plural FCCHs within one node are interconnected with the Ethernet-type dedicated bus 59. The Ethernet-type dedicated bus 59 also connects to the exchange CPU 52 so that data transmission and reception of the central control section can be performed. The FCCH 53 communicates with the FCCH 54 in another exchange via a special channel acting as a signal channel in the digital trunk circuit (TDI). The control signal transmitted and received via the signal channel has the function of recognizing a destination node with the node number 33 existing in the physical accommodation location information 32 and then establishing a route between FCCHs. For example, the maintenance signal is transmitted from the node 1 to the node 3 by way of the centralized maintenance terminal 51, the CPU 52, the FCCH 53, FCCH 54, FCCH 55, FCCH 56, the CPU 57, and the memory 58, so that data can be read out of the memory 58 and written thereinto. The same route can be established from the node 3 to the node 1 inversely.

As described above the FCCH is a data link control circuit that can set a direct communicable route for transmission and reception by designating all node exchanges and all node numbers. The internal bus being an Ethernet-type bus allows broadcast transmission. That is, all the FCCHs existing in the node exchange simultaneously receive information which is broadcast from the CPU 52 to the Ethernet-type bus 59. Then, each FCCH identifies the node number of a destination and then judges whether the information is transmitted to the digital dedicated line or discarded. Thus, only when transmission is decided, the information is transmitted. The routing information regarding transmission or discarding is previously set from the central control section to each FCCH. In the broadcast operation, a specific fixed value as a broadcast number is specified as the node number of the destination. The broadcast node number is broadcast to all nodes. The FCCH corresponds to a bride in a LAN. As a generally-known technique, there is a spanning tree system including a bridge to avoid broadcast data looped in a network. The FCCH is previously configured with the optimum routing table broadcast in the spanning tree system.

When the centralized maintenance terminal 26, for example, varies the network common memory in the NDM11 through the broadcasting operation in a network, the central control section 9 rewrites the NDM11 while it can indicate to rewrite the NDMs in all the nodes through the FCCH 26 according to the broadcast procedure.

Basically, it must be ensured that the same NDM is used for all exchanges. The central control section 9 at the switching node having the centralized maintenance terminal 26 periodically diagnoses whether the checksum of the NDM in another node exchange is the same as the checksum of the NDM11. When the diagnosis finds the difference, the NDM 11 is loaded to a destination node exchange via the FCCH. When the digital line between node exchanges, for example, fails due to troubles and then recovers, all pieces of trouble information are sent to the centralized maintenance terminal via the FCCH. Whether or not the NDM in the node exchange involved in failure is the same as the NDM11 can be diagnosed manually from the centralized maintenance terminal or automatically by the central control section 9.

Next, the method of relocating a subscriber of a certain node exchange to another will be described here. When a subscriber with a personal number registered in the NDM is relocated to another exchange, a maintenance crew indicates the central control section 9 by inputting the personal number from the centralized maintenance terminal 26, reads out the terminating logical number information 42 of the subscriber lead by a translator and the registered in the NDM, and then obtains the physical accommodation information 32 read out of the table in the conversion section 32 in response to the terminating logical number information 42. The content of the physical accommodation location information 32 is changed into the node number 33 and the TDSW accommodation location 34. At the same time, the central control section 9 broadcasts all NDM data in all node exchanges onto the Ether-type bus 59 to change them.

As described above, the centralized maintenance terminal 26 can change data of all exchange nodes by one instruction. This eliminates a change in a telephone number.

In the memory configuration of the conversion section of the present embodiment, one-to-one correspondences between logical accommodation location and physical accommodation location have been described above. Clearly, the conversion section may be easily built in a one-to-N memory configuration of an N-to-one memory configuration. The subscriber can easily operate the conversion table by arranging it in the memory sections 24 and 25, not in the NDM.

As described above, in the office data management system, the subscriber's number assigning system and the same number migrating system for an exchange related to the present invention, an office data management system can be effectively provided where all exchanges can be operated as one exchange in a distributed node switching system where a network is configured of plural exchanges.

In such a switching system, all node exchanges must be operated and managed in common while the area origination number depends on regional conditions where the node is installed, so that it is necessary to operate and manage all node exchanges at nodes, respectively. However, the present invention has the effect of capable of providing the office data management system which has two kinds of data including common office data operated and managed in common at each node and individual office data respectively operated and managed each node.

Furthermore, in the subscriber's number assigning system, a telephone number can be effectively assigned to a person, instead of a telephone set.

Moreover, the present invention has the advantage of providing the same number migrating system that can use the same number even when a subscriber is accommodated to another exchange. The present invention has the advantage of providing the system of changing correspondences between a person and a telephone set in accordance with a maintenance operation procedure or by a subscriber itself.

In addition, the present invention has the advantage of providing the system of facilitating the maintenance operation procedure involving in changes in subscriber to plural exchanges.

The entire disclosure of Japanese Patent Application No. 9-297355 filed on Oct. 29, 1997 including specification, claims, drawing and summary are incorporated herein by reference in its entirety.

What is claimed is:

1. An office data management system comprising:

plural exchanges interconnected to configure a switching network; each of said plural exchanges including a main storage memory;

said main storage memory containing individual office data and common office data, said individual and common office data including numbering plan information and subscriber information necessary for switching process;

said individual office data being individually operated and managed in each of said exchanges;

said common office data being operated and managed in common by all said exchanges in said network;

wherein each of said exchanges comprises:

means for receiving and storing a selection signal dialed by a subscriber; and means for analyzing said stored selection signal according to said numbering plan information existing in said office data;

wherein said stored selection signal is first collated with numbering plan information existing in said common office data;

wherein a connection process is performed in accordance with said common numbering plan information when a corresponding number can be registered as common numbering plan information and is recognized as an extension, a B board, a call origination, or a special service code, in said network;

wherein said corresponding number is collated with individual numbering plan information existing in said individual office data individually registered at each node when said corresponding number cannot be recognized;

wherein a connection process is performed in accordance with said individual numbering plan when it can be recognized whether said corresponding number is an extension, a B board, a call origination, a special service code, in an exchange accommodating an originator;

wherein origination restriction is performed when said corresponding number cannot be recognized.

2. The office data management system defined in claim 1, wherein said common office data has means for issuing data registration and data changing instruction from a centralized maintenance I/O unit connected to a specific exchange in said network and thus batch registering and changing common office data in said main storage memory of all said exchanges within said network by means of broadcast transmission means via a line through which a call control signal and a maintenance signal are transmitted between exchanges; and wherein said individual office data has means for registering and changing only individual office data in said main storage memory in an exchange by specifying an exchange having individual office data which are changed from said centralized maintenance I/O unit via a line through which said call control signal and said maintenance signal are communicated between exchanges and then issuing data registration and change instruction; and wherein said individual office data comprises means for registering and changing only individual office data in said main storage memory in an exchange by issuing data registration and data changing instruction from a maintenance I/O unit connected to each exchange.

3. The office data management system defined in claim 2, wherein said line which carries said call control signal and said maintenance signal between said exchanges includes means for transmitting and receiving said maintenance signal in a multiplex mode on a line used for transmission and reception of said call control signal, not a dedicated line, for said maintenance signal.

4. The base data management system defined in claim 1, wherein said common office data comprises:

means for periodically checking whether or not said common office data is the same as that for a specific exchange acting as a master exchange in said network via a line through which call control signals and maintenance signals used between exchanges are communicated with other exchanges; and means for checking whether or not said common office data is the same that for said master exchange via said line when said line which carries a call control signal and a maintenance signal from said master exchange to other exchanges recovers from failure and then becomes a communicable state;

wherein an exchange that is found to have common office data different from that in said master exchange as a result of said checking means includes a means for copying common office data from said master exchange via said line.

5. The office data management system defined in claim 4, wherein said line which carries said call control signal and said maintenance signal between said exchanges includes means for transmitting and receiving said maintenance signal in a multiplex mode on a line used for transmission and reception of said call control signal, not a dedicated line, for said maintenance signal.

6. An office data management system comprising:

plural exchanges interconnected to configure a switching network; each of said plural exchanges including a main storage memory;

said main storage memory containing individual office data and common office data, said individual and common office data including numbering plan information and subscriber information necessary for switching process;

said individual office data being individually operated and managed in each of said exchanges;

said common office data being operated and managed in common by all said exchanges in said network wherein said common office data has means for issuing data registration and data changing instruction from a centralized maintenance I/O unit connected to a specific exchange in said network and thus batch registering and changing common office data in said main storage memory of all said exchanges within said network by means of broadcast transmission means via a line through which a call control signal and a maintenance signal are transmitted between exchanges; and wherein said individual office data has means for registering and changing only individual office data in said main storage memory in an exchange by specifying an exchange having individual office data which are changed from said centralized maintenance I/O unit via a line through which said call control signal and said maintenance signal are communicated between exchanges and then issuing data registration and change instruction; and wherein said individual office data comprises means for registering and changing only individual office data in said main storage memory in an exchange by issuing data registration and data changing instruction from a maintenance I/O unit connected to each exchange.

7. The office data management system defined in claim 6, wherein said line which carries said call control signal and said maintenance signal between said exchanges includes means for transmitting and receiving said maintenance signal in a multiplex mode on a line used for transmission and reception of said call control signal, not a dedicated line, for said maintenance signal.

8. The office data management system defined in claim 6, wherein said line which carries said call control signal and said maintenance signal between said exchanges includes means for transmitting and receiving said maintenance signal in a multiplex mode on a line used for transmission and reception of said call control signal, not a dedicated line, for said maintenance signal.

9. A subscriber's number assigning system in an office data management system, wherein subscriber's numbers allocated to subscribers in a network configured of plural exchanges are managed based on numbering plan information and subscriber information of common office data operated and managed in common in all exchanges so that said subscribers can be operated and managed as accommodated by one exchange; said office data management system comprising plural exchanges interconnected to configure a switching network; each of said plural exchanges including a main storage memory; said main storage memory containing individual office data and common office data including numbering plan information and subscriber information necessary for switching process; said individual office data being individually operated and managed in each of said exchanges; said common office data being operated and managed in common by all said exchanges in said network.

10. The subscriber's number assigning system defined in claim 9, wherein in an exchange having said main storage memory by which a logical accommodation location, not a physical accommodation location, of a telephone set, is obtained as subscriber information when a dialed destination particularly indicates a subscriber including an extension or a B board by analyzing a selection signal dialed by a subscriber according to common numbering plan information in said common office data, said exchange has accommodation location conversion means within a common memory which can be accessed from and changed by all the exchanges in said network, said accommodation location conversion means associating a logical accommodation location with a physical accommodation location of a telephone set or a subscriber line, so that a subscriber's number is assigned to a telephone user, without comparing a subscriber's number with a physical telephone set in a one-to-one relationship.

11. The subscriber's number assigning system defined in claim 10, wherein said conversion information management means that associates a logical accommodation location stored in said common memory with a physical accommodation location of a telephone set or a subscriber line stored therein includes means for dynamically changing correspondences between a logical accommodation location and a physical telephone set by a procedure from a telephone set or in accordance with an instruction from said centralized control unit in an exchange.

12. A subscriber's number assigning system in an office data management system, wherein subscriber's numbers allocated to subscribers in a network configured of plural exchanges are managed based on numbering plan information and subscriber information of common office data operated and managed in common in all exchanges so that said subscribers can be operated and managed as accommodated by one exchange; said office data management system comprising plural exchanges interconnected to configure a switching network; each of said plural exchanges including a main storage memory; said main storage memory containing individual office data and common office data, as office data including numbering plan information and subscriber information necessary for switching process; said individual office data being individually operated and managed in each of said exchanges; said common office data being operated and managed in common by all said exchanges in said network; wherein said each of said exchanges comprises means for receiving and storing a selection signal dialed by a subscriber; and means for analyzing said stored selection signal according to said numbering plan information existing in said office data; wherein said stored selection signal is first collated with numbering plan information existing in said common office data; wherein a connection process is performed in accordance with said common numbering plan information when a corresponding number can be registered as common numbering plan information and is recognized as an extension, a B board, a call origination, or a special service code in said network; wherein said corresponding number is collated with individual numbering plan information existing in said individual office data individually registered at each node when said corresponding number cannot be recognized; wherein a connection process is performed in accordance with said individual numbering plan when it can be recognized whether said corresponding number is an extension, a B board, a call origination, or a special service code in an exchange accommodating an originator; wherein origination restriction is performed when said corresponding number cannot be recognized.

13. The subscriber's number assigning system defined in claim 12, wherein an exchange having said main storage memory by which a logical accommodation location, not a physical accommodation location, of a telephone set, is obtained as subscriber information when a dialed destination particularly indicates a subscriber including an extension of a B board by analyzing a selection signal dialed by a subscriber according to common numbering plan information in said common office data, said exchange has accommodation location conversion means within a common memory which can be accessed from and changed by all the exchanges in said network, said accommodation location conversion means associating a logical accommodation location with a physical accommodation location of a telephone set or a subscriber line, so that a subscriber's number is assigned to a telephone user, without comparing a subscriber's number with a physical telephone set in a one-to-one relationship.

14. The subscriber's number assigning system defined in claim 13, wherein said conversion information management means that associates a logical accommodation location stored in said common memory with a physical accommodation location of a telephone set or a subscriber line stored therein includes means for dynamically changing correspondences between a logical accommodation location and a physical telephone set by a procedure from a telephone set or in accordance with an instruction from said centralized control unit in an exchange.

15. A same number migrating system in a subscriber's number assigning system, wherein in an exchange having said main storage memory by which a logical accommodation location, not a physical accommodation location, of a telephone set, is obtained as subscriber information when a dialed destination particularly indicates a subscriber including an extension or a B board by analyzing a selection signal dialed by a subscriber according to common numbering plan information in said common office data, said exchange has conversion information management means within a common memory which can be accessed from and changed by all the exchanges in said network, said conversion information management means associating a logical accommodation location with a physical accommodation location of a telephone set or a subscriber line; wherein when a subscriber is accommodated from an exchange to another, the same subscriber number is maintained by varying only correspondences between a logical accommodation location and a physical accommodation location of subscriber information in said common memory according to an office data management system; said subscriber's number assigning system in an office data management system, wherein subscriber's numbers allocated to subscribers in a network configured of plural exchanges are managed based on numbering plan information and subscriber information of common office data operated and managed in common in all exchanges so that said subscribers can be operated and managed as accommodated by one exchange; said office data management system comprising plural exchanges interconnected to configure a switching network; each of said plural exchanges including a main storage memory; said main storage memory containing individual office data and common office data, as office data including numbering plan information and subscriber information necessary for switching process; said individual office data being individually operated and managed in each of said exchanges; said common office data being operated and managed in common by all said exchanges in said network; wherein said common office data has means for issuing data registration and data changing instruction from a centralized maintenance I/O unit connected to a specific exchange in said network and this batch registering and changing common office data in said main storage memory of all said exchanges within said network by means of broadcast transmission means via a line through which a call control signal and a maintenance signal are transmitted between exchanges; and wherein said individual office data has means for registering and changing only individual office data in said main storage memory in an exchange by specifying an exchange having individual office data which are changed from said centralized maintenance I/O unit via a line through which said call control signal and said maintenance signal are communicated between exchanges and then issuing data registration and change instruction; and wherein said individual office data comprises means for registering and changing only individual office data in said main storage memory in an exchange by issuing data registration and data changing instruction from a maintenance I/O unit connected to each exchange.

16. The same number migrating system defined in claim 15, wherein in an exchange having said main storage memory by which a logical accommodation location, not a physical accommodation location, of a telephone set, is obtained as subscriber information when a dialed destination particularly indicates a subscriber including an extension of a B board by analyzing a selection signal dialed by a subscriber according to common numbering plan information in said common office data, said exchange has accommodation location conversion means within a common memory which can be accessed from and changed by all the exchanges in said network, said accommodation location conversion means associating a logical accommodation location with a physical accommodation location of a telephone set or a subscriber line, so that a subscriber's number is assigned to a telephone user, without comparing a subscriber's number with a physical telephone set in a one-to-one relationship.

17. A same number migrating system in a subscriber's number assigning system, wherein in an exchange having said main storage memory by which a logical accommodation location, not a physical accommodation location, of a telephone set, is obtained as a subscriber information when a dialed destination particularly indicates a subscriber including an extension on a B board by analyzing a selection signal dialed by a subscriber according to common numbering plan information in said common office data, said exchange has conversion information management means within a common memory which can be accessed from and changed by all the exchanges in said network, said conversion information management means associating a logical accommodation location with a physical accommodation location of a telephone set or a subscriber line; wherein when a subscriber is accommodated from an exchange to another, the same subscriber number is maintained by varying only correspondences between a logical accommodation location and a physical accommodation location of subscriber information in said common memory according to an office data management system; said subscriber's number assigning system in an office data management system, wherein subscriber's numbers allocated to subscribers in a network configured of plural exchanges are managed based on numbering plan information and subscriber information of common office data operated and managed in common in all exchanges so that said subscribers can be operated and managed as accommodated by one exchange; said office data management system comprising plural exchanges interconnected to configure a switching network; each of said plural exchanges including a main storage memory; said main storage memory containing individual office data and common office data, as office data including numbering plan information and subscriber information necessary for switching process; said individual office data individually operated and managed in each of said exchanges; said common office data operated and managed in common by all said exchanges in said network; wherein each of said exchanges comprises means for receiving and storing a selection signal dialed by a subscriber; and means for analyzing said stored selection signal according to said numbering plan information existing in said office data; wherein said stored selection signal is first collated with numbering plan information existing in said common office data; wherein a connection process is performed in accordance with said common numbering plan information when a corresponding number can be registered as common numbering plan information and is recognized as an extension, a B board, a call origination, or a special service code in said network; wherein said corresponding number is collated with individual numbering plan information existing in said individual office data individually registered at each node when said corresponding number cannot be recognized; wherein a connection process if performed in accordance with said individual numbering plan when it can be recognized whether said corresponding number is an extension, a B board, a call origination, or a special service code in an exchange accommodating an originator; wherein origination restriction is performed when said corresponding number cannot be recognized; wherein said common office data has means for issuing data registration and data changing instruction from a centralized maintenance I/O unit connected to a specific exchange in said network and thus batch registering and changing common office data in said main storage memory of all said exchanges within said network by means of broadcast transmission means via a line through which a call control signal and a maintenance signal are transmitted between exchanges; and wherein said individual office data has means for registering and changing only individual office data in said main storage memory in an exchange by specifying an exchange having individual office data which are changed from said centralized maintenance I/O unit via a line through which said call control signal and said maintenance signal are communicated between exchanges and then issuing data registration and change instruction; and wherein said individual office data comprises means for registering and changing only individual office data in said main storage memory in an exchange by issuing data registration and data changing instruction from a maintenance I/O unit connected to each exchange.

18. The same number migrating system defined claim 17, wherein an exchange having said main storage memory by which a logical accommodation location, not a physical accommodation location, of a telephone set, is obtained as subscriber information when a dialed destination particularly indicates a subscriber including an extension or a B board by analyzing a selection signal dialed by a subscriber according to common numbering plan information in said common office data, said exchange has accommodation location conversion means within a common memory which can be accessed from and changed by all the exchanges in said network, said accommodation location conversion means associating a logical accommodation location with a physical accommodation location of a telephone set or a subscriber line, so that a subscriber's number is assigned to a telephone user, without comparing a subscriber's number with a physical telephone set in a one-to-one relationship.

\* \* \* \* \*